US012611716B2

(12) United States Patent
Träff

(10) Patent No.: US 12,611,716 B2
(45) Date of Patent: Apr. 28, 2026

(54) POROUS METALLIC MATERIAL

(71) Applicant: VALMET AB, Sundsvall (SE)

(72) Inventor: Henrik Träff, Kvissleby (SE)

(73) Assignee: VALMET AB, Sundsvall (SE)

( * ) Notice: Subject to any disclaimer, the term of this patent is extended or adjusted under 35 U.S.C. 154(b) by 364 days.

(21) Appl. No.: 18/253,275

(22) PCT Filed: Dec. 7, 2021

(86) PCT No.: PCT/SE2021/051210
§ 371 (c)(1),
(2) Date: May 17, 2023

(87) PCT Pub. No.: WO2022/154708
PCT Pub. Date: Jul. 21, 2022

(65) Prior Publication Data
US 2023/0405680 A1 Dec. 21, 2023

(30) Foreign Application Priority Data
Jan. 18, 2021 (SE) .................................... 2150044-2

(51) Int. Cl.
*B22F 10/36* (2021.01)
*B22F 10/37* (2021.01)
(Continued)

(52) U.S. Cl.
CPC .............. *B22F 10/36* (2021.01); *B22F 10/37* (2021.01); *B22F 10/38* (2021.01); *B22F 10/66* (2021.01);
(Continued)

(58) Field of Classification Search
CPC .......... B22F 10/36; B22F 10/37; B22F 10/38; B22F 10/66; B22F 10/68; B22F 2202/01;
(Continued)

(56) References Cited

U.S. PATENT DOCUMENTS

2007/0142914 A1 6/2007 Jones et al.
2010/0291401 A1* 11/2010 Medina .................. B23K 26/32
219/121.66
(Continued)

FOREIGN PATENT DOCUMENTS

CN 108145163 A 6/2018
CN 109454237 A 3/2019
(Continued)

OTHER PUBLICATIONS

NPL: on-line translation of WO 2020/216884 A1, Oct. 2020 (Year: 2020).*
(Continued)

*Primary Examiner* — Jie Yang
(74) *Attorney, Agent, or Firm* — Foley & Lardner LLP

(57) ABSTRACT
A method for producing a product comprising a porous metallic material and a product comprising a porous metallic material. Said method comprises the steps of:—building the porous metallic material of the product by additive manufacturing; and—polishing at least a part of a surface of said porous metallic material of said product by vibration polishing.

9 Claims, 2 Drawing Sheets

S1 | Building a porous metallic material by additive manufacturing

S2 | Polishing a surface by vibration polishing

S3 | Possibly incorporating reinforcement structure

(51) Int. Cl.

| | |
|---|---|
| *B22F 10/38* | (2021.01) |
| *B22F 10/66* | (2021.01) |
| *B33Y 40/20* | (2020.01) |
| *B33Y 80/00* | (2015.01) |

(52) U.S. Cl.
CPC .............. *B33Y 40/20* (2020.01); *B33Y 80/00* (2014.12); *B22F 2202/01* (2013.01)

(58) Field of Classification Search
CPC .... B22F 2999/00; B22F 3/1118; B24B 31/06; B33Y 40/10; B33Y 40/20; B33Y 80/00
See application file for complete search history.

(56) References Cited

U.S. PATENT DOCUMENTS

| | | |
|---|---|---|
| 2019/0054535 A1 | 2/2019 | Norton et al. |
| 2019/0388128 A1* | 12/2019 | Wilson .................... C22F 1/183 |
| 2022/0226903 A1* | 7/2022 | Hansal .................... B22F 10/60 |

FOREIGN PATENT DOCUMENTS

| | | |
|---|---|---|
| CN | 110238714 A | 9/2019 |
| CN | 111036902 A | 4/2020 |
| CN | 212264537 U | 1/2021 |
| EP | 3 446 812 A1 | 2/2019 |
| EP | 3 639 974 A1 | 4/2020 |
| JP | S54-116305 A | 9/1979 |
| WO | WO-2016012733 A1 * | 1/2016 ............... D21J 3/00 |
| WO | WO-2016/061148 A1 | 4/2016 |
| WO | WO-2020216884 A1 * | 10/2020 ............. B22F 10/60 |

OTHER PUBLICATIONS

NPL: on-line translation of WO-2016012733-A1, Jan. 2016 (Year: 2016).*

Bernhardt et al., "Surface conditioning of additively manufactured titanium implants and its influence on materials properties and in vitro biocompatibility", Materials Science & Engineering C, vol. 119, DOI: 10.1016/J.MSEC.2020.111631.

Chinese Office Action and Search Report issued in a Chinese application No. 202180090995.3, dated Jun. 7, 2025.

Extended European Search Report issued in connection with EP Appl. No. 21919981.7, dated May 13, 2025.

Guddati Subhash, et al., "Recent advancements in additive manufacturing technologies for porous material applications", The International Journal of Advanced Manufacturing Technology, Springer, London, vol. 105, No. 1-4, Aug. 5, 2019.

* cited by examiner

POROUS METALLIC MATERIAL

TECHNICAL FIELD OF THE INVENTION

The present invention relates to a product comprising a porous metallic material and to a method for producing such a product comprising a porous metallic material.

BACKGROUND

With additive manufacturing, such as laser powder-bed fusion, both perforated and porous materials can be built up. Perforated materials can be designed with channels through the material according to a CAD design of the material. A porous material on the other hand gets its porosity characteristics and specific degree of porosity by changing certain production parameters. These could be for example laser parameters such as laser power, pulse duration, pulse frequency or laser beam radius or material parameters such as type of material and thickness of each powder layer. The surface of porous materials produced by additive manufacturing is however for some applications too rough.

SUMMARY

An object of the invention is to provide a product comprising an improved porous metallic material and a method for producing such a product with an improved porous metallic material.

A further object of the invention is to provide a product comprising a porous metallic material with a smooth surface and a method for producing such a product.

This is achieved by a method and a product according to the independent claims.

According to one aspect of the invention a method for producing a product comprising a porous metallic material is provided, wherein said method comprises the steps of:

building the porous metallic material of the product by additive manufacturing; and polishing at least a part of a surface of said porous metallic material of said product by vibration polishing.

According to another aspect of the invention a product comprising a porous metallic material produced by the method described above is provided.

According to another aspect of the invention a product comprising a porous metallic material is provided, wherein said porous metallic material has been built by additive manufacturing and wherein at least a part of a surface of said porous metallic material has been polished by vibration polishing.

Hereby, a surface of the porous metallic material, which may be somewhat rough due to the additive manufacturing production process, is polished by a method which is both gentle and effective. With vibration polishing there is less risk than with other polishing methods, that the porous structure at the surface is destroyed and clogged which could impair the porosity of the material. The vibration polishing of the porous metallic material may even improve the porosity of the porous metallic material thanks to a cleaning effect from the vibration polishing. In addition to a polished and smooth surface achieved by the vibration polishing the porous metallic material will also be cleaned during the polishing. Any loose material will be removed in the polishing process and there is no risk that material will clog pores in the material. Even further the vibration polishing will give rise to a shining surface of the porous metallic material which may be advantageous for some applications.

In some embodiments of the invention the step of building the porous metallic material of the product comprises controlling process parameters and/or material parameters for the additive manufacturing in order to control the porosity for the porous metallic material being built. Hereby a product having any wanted porosity can be built.

In some embodiments of the invention the controlling of process parameters comprises controlling laser parameters and/or a thickness of metallic powder layers used for the additive manufacturing.

In some embodiments of the invention the step of polishing comprises the use of a processing media in the form of a number of processing bodies, each having a volume in the interval between 0,004-2 $cm^3$ or between 0,004-1 $cm^3$.

In some embodiments of the invention the method further comprises the step of incorporating a reinforcement structure to the porous metallic material of the product. Hereby a mechanical strength of the product can be improved.

In some embodiments of the invention the step of building the porous metallic material of the product comprises providing a controlled variation of porosity over one or more directions of extension of the porous metallic material in the product.

DETAILED DESCRIPTION OF EMBODIMENTS

As the terms are used in this patent text there is a difference between a perforated material and a porous material. In a perforated material there are perforations which have been designed and which have defined sizes and positions in the material. A porous material on the other hand, as the term porous is used in this text, does not have perforations which are designed and predetermined in size and location. A material can be porous without having any designed perforations, i.e. a porous material has open spaces randomly distributed in its volume. A degree of porosity can be measured as an amount of such open spaces. A degree of porosity and also other porosity characteristics such as how course or fine meshed the porous material is may depend on certain production parameters as will be further described below.

Additive manufacturing, such as laser powder-bed fusion, is suitable for production of porous materials. By changing certain process parameters and/or material parameters porosity characteristics and degree of porosity can be adjusted as required. The process parameters to be changed could be for example laser parameters such as one or more of a laser power, a laser pulse duration, a laser pulse frequency, laser beam interspacing, laser scan speed and laser beam radius. Another process parameter which can be changed in order to adjust porosity of the material is thickness of each powder layer provided during the additive manufacturing. Material parameters which can be changed for adjusting a porosity are for example type of material and size of granulation of the material powder used for building the porous metallic material by the additive manufacturing. For example, a porous material may be achieved if a laser power is decreased and laser beam interspacing is increased compared to production parameters when producing a compact material.

According to the invention a method for producing a product comprising a porous metallic material is provided.

Figure 1:
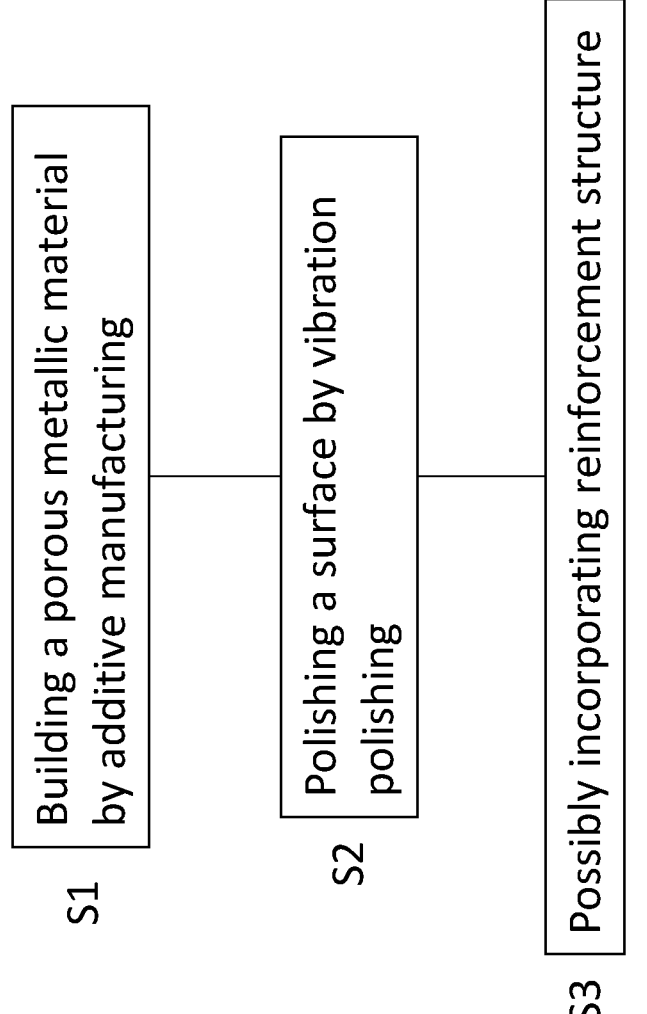
FIG. 1 is a flow chart of a method according to one embodiment of the invention.

In FIG. 1 a flow chart of a method according to one embodiment of the invention is shown. The steps of the method are described in order below:

S1: Building the porous metallic material of the product by additive manufacturing. As described above process parameters and material parameters during the additive manufacturing can be controlled in order to control porosity characteristics for the porous metallic material being built.

The step of building the porous metallic material of the product can furthermore in some embodiments of the invention comprise providing a controlled variation of porosity degree over one or more directions of extension of the porous metallic material in the product. Hereby products comprising porous metallic material can be tailored with a varying porosity as required by different applications. Furthermore, a designed perforation of the material, i.e. specifically sized and positioned channels, can be combined with the porosity and be built together by additive manufacturing to make up the product according to some embodiments of the invention.

S2: Polishing at least one surface of said porous metallic material of said product by vibration polishing.

Vibration polishing is performed by vibrating the object to be polished together with a processing media in the form of a number of processing bodies of a suitable material. For example, ceramic, steel or tungsten carbide processing bodies can be used as processing media. The use of vibration polishing as polishing method allows the surface of the porous metallic material to maintain its porosity, i.e. the surface will not be clogged and pores will not be obstructed as could be the case when using other polishing methods. The vibration polishing will have a cleaning effect which may improve porosity features of the material. This can be especially useful in some technical areas where the porosity needs to be reliable and controllable. An example of a technical area where this is suitable is forming of fiber-based products where a mold for the forming is made of a porous material in order to let fluids pass during the forming. A surface of the mold which has been polished by vibration polishing according to the invention may have less risk for sticking to the formed object and may be easier to clean in addition to the positive effects of a reliable porosity which is achieved according to the method of the invention. Another example is a mixing device for a fiber-pulp processing system. The mixing device can comprise a porous metallic material which has been polished by vibration polishing according to this invention whereby a fluid to be mixed into the fiber pulp in the fiber pulp processing system can be dispersed through the porous metallic material when delivered into the fiber pulp and hereby mixing may be improved.

Vibration polishing is often performed by the addition of a grinding compound comprising abrasive particles. However, according to some embodiments of the invention the step of polishing is provided without an addition of a grinding compound. A grinding compound could clog the pores of the material and according to some embodiments of the invention only water and possibly some detergent and/or flocculating agent and no grinding compound comprising abrasive particles is added during the vibration polishing. Hereby there is less risk that the porous material is clogged and the porosity of the material will be more reliable. However, if a grinding compound is used during the vibration polishing another alternative may be to clean the material afterwards, for example by ultrasonic washing.

The step of polishing comprises according to the invention the use of a processing media in the form of a number of processing bodies. In some embodiments of the invention each processing body has a volume larger than $0.004$ $cm^3$ and smaller than 2 $cm^3$ and in some embodiments each processing body has a volume which is larger than $0.004$ $cm^3$ and smaller than 1 $cm^3$, i.e. in some embodiments of the invention the processing bodies each has a volume between $0.004$-$2.000$ $cm^3$ and in some embodiments between $0.004$-$1.000$ $cm^3$. By using comparatively small sized processing bodies as processing media in the vibration polishing there is less risk to destroy the porous material during polishing. However, the size and mass of the processing bodies need to be larger than a certain lower limit in order to be able to perform the wanted polishing. This lower limit is dependent on vibration frequency and amplitude of the vibration polishing. For higher frequency and/or amplitude smaller processing bodies can be used. If the processing bodies are made from materials having higher densities the volume of the processing bodies can also be made smaller while still providing a good polishing effect. Furthermore, the geometrical shape of the polishing bodies will also contribute to the polishing effect. Materials which may be suitable to use for the polishing bodies are for example ceramics, steel or tungsten carbides or other similar tungsten based materials.

The method according to the invention may further comprise an additional step:

S3: Incorporating a reinforcement structure to the porous metallic material of the product. A reinforcement structure, also called a lattice structure may be melted into the porous metallic material during the building of the porous metallic material by additive manufacturing. Hereby a product comprising a porous metallic material can be provided having a suitable mechanical strength.

A product comprising a porous metallic material produced by the method as described above is also provided according to the invention.

A product is provided according to the invention comprising a porous metallic material, wherein said porous metallic material has been built by additive manufacturing, wherein at least a part of a surface of said porous metallic material has been polished by vibration polishing.

Figure 2:
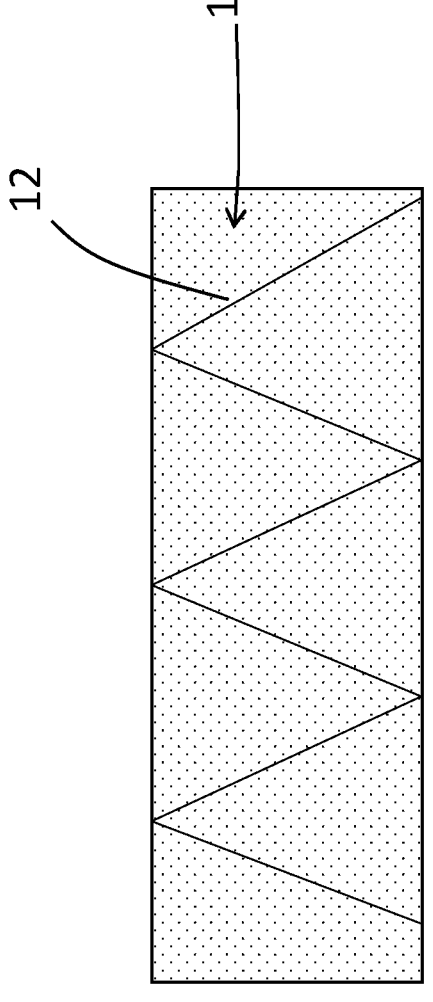
FIG. 2 shows schematically a porous metallic material comprising a reinforcement structure.

In some embodiments of the invention a reinforcement structure is incorporated into said porous metallic material of the product. FIG. 2 shows schematically a porous metallic material 11 comprising a reinforcement structure 12.

The invention claimed is:

1. A method for producing a mixing device for a fiber-pulp processing system, the mixing device comprising a porous metallic material, the method comprising steps of:

building the porous metallic material of the mixing device by additive manufacturing; and polishing at least a part of a surface of the porous metallic material of mixing device by vibration polishing using a processing media comprising a plurality of processing bodies, each having a volume in an interval between $0.004$-2 $cm^3$.

2. The method according to claim 1, wherein the step of building the porous metallic material of the mixing device comprises controlling process parameters and/or material parameters for the additive manufacturing in order to control a porosity of the porous metallic material being built.

3. The method according to claim 2, wherein the controlling of process parameters comprises controlling laser parameters and/or a thickness of metallic powder layers used for the additive manufacturing.

4. The method according to claim 1, wherein the method further comprises a step of incorporating a reinforcement structure to the porous metallic material of the mixing device.

5. The method according to claim 1, wherein the step of building the porous metallic material of the mixing device comprises providing a controlled variation of porosity over one or more directions of extension of the porous metallic material in the mixing device.

6. The method according to claim 1, wherein the porous metallic material further comprises a plurality of designed perforations having defined sizes and positions.

7. A mixing device for a fiber-pulp processing system, the mixing device comprising:

a porous metallic material, wherein:

said porous metallic material has been built by additive manufacturing, and at least a part of a surface of said porous metallic material has been polished by vibration polishing using a processing media comprising a plurality of processing bodies, each having a volume in an interval between 0.004-2 cm$^3$.

8. The mixing device according to claim 7, wherein a reinforcement structure is incorporated into said porous metallic material.

9. The mixing device according to claim 7, wherein the porous metallic material further comprises a plurality of designed perforations having defined sizes and positions.

\* \* \* \* \*